US009647251B2

(12) United States Patent
Prinz et al.

(10) Patent No.: US 9,647,251 B2
(45) Date of Patent: May 9, 2017

(54) DEVICE FOR COOLING BATTERIES

(75) Inventors: Dominik Prinz, Elsdorf (DE); Stephan Koester, Langerwehe (DE); Andreas Emmerich, Aachen (DE); Jens Talmon, Cologne (DE)

(73) Assignee: HANON SYSTEMS, Daejeon-si (KR)

( * ) Notice: Subject to any disclaimer, the term of this patent is extended or adjusted under 35 U.S.C. 154(b) by 734 days.

(21) Appl. No.: 13/446,066

(22) Filed: Apr. 13, 2012

(65) Prior Publication Data

US 2012/0261107 A1   Oct. 18, 2012

(30) Foreign Application Priority Data

Apr. 14, 2011  (DE) .................. 10 2011 002 064
Apr. 18, 2011  (DE) .................. 10 2011 002 133
Mar. 26, 2012  (DE) .................. 20 2012 101 076 U

(51) Int. Cl.
  *F28F 7/00*   (2006.01)
  *H01M 2/10*   (2006.01)
  *H01M 10/625*  (2014.01)
  *H01M 10/6556* (2014.01)
  *H01M 10/6554* (2014.01)
  *H01M 10/613*  (2014.01)

(52) U.S. Cl.
  CPC ....... *H01M 2/1083* (2013.01); *H01M 10/613* (2015.04); *H01M 10/625* (2015.04); *H01M 10/6554* (2015.04); *H01M 10/6556* (2015.04)

(58) Field of Classification Search
  CPC .... F28F 7/00; F28F 13/00; H05K 7/20; F25D 31/00; F28D 15/00

USPC ............ 165/80.1, 80.2, 80.3, 80.4, 185, 46; 429/120; 361/699
  See application file for complete search history.

(56) References Cited

U.S. PATENT DOCUMENTS

| 2,913,011 | A | * | 11/1959 | Noyes et al. .................. 138/133 |
| 3,290,176 | A | * | 12/1966 | Berju ...................... H01M 2/38 |
| | | | | 429/120 |
| 4,748,495 | A | * | 5/1988 | Kucharek ...................... 257/713 |
| 5,036,384 | A | * | 7/1991 | Umezawa ...................... 257/714 |
| 5,548,482 | A | * | 8/1996 | Hatauchi et al. ............. 361/720 |
| 6,087,036 | A | * | 7/2000 | Rouillard ............... H01M 2/202 |
| | | | | 429/120 |
| 6,131,646 | A | * | 10/2000 | Kelley ......................... 165/80.1 |
| 6,216,771 | B1 | * | 4/2001 | Holmberg ............. H01L 23/473 |
| | | | | 165/104.33 |
| 6,311,764 | B1 | * | 11/2001 | Schulz et al. ................... 165/56 |
| 7,106,588 | B2 | * | 9/2006 | Oberlin ................. H01L 23/427 |
| | | | | 257/714 |

(Continued)

FOREIGN PATENT DOCUMENTS

| DE | 102005017648 | | 10/2006 | |
| DE | 102006059989 | A1 * | 6/2008 | ........ H01M 10/6556 |

(Continued)

*Primary Examiner* — Len Tran
*Assistant Examiner* — Gustavo Hincapie Serna
(74) *Attorney, Agent, or Firm* — Fraser Clemens Martin & Miller LLC; James D. Miller

(57) ABSTRACT

A device for cooling batteries includes a cooling plate for receiving at least one battery thereon and at least one heat transfer element in heat transfer relationship with the cooling plate. A mechanical stress produced by a contact force causes the at least one heat transfer element to thermally abut the cooling plate.

10 Claims, 2 Drawing Sheets

(56) References Cited

U.S. PATENT DOCUMENTS

| | | | | |
|---|---|---|---|---|
| 7,400,504 B2* | 7/2008 | Campbella | ................ | G06F 1/20 165/80.4 |
| 9,196,938 B2* | 11/2015 | Yoon | ..................... | H01M 10/65 |
| 2003/0017384 A1 | 1/2003 | Marukawa et al. | | |
| 2006/0060328 A1* | 3/2006 | Ewes et al. | ................... | 165/80.2 |
| 2006/0198150 A1* | 9/2006 | Kinoshita et al. | ............. | 362/373 |
| 2007/0125517 A1* | 6/2007 | Schaper | ........................ | 165/80.2 |
| 2008/0066489 A1* | 3/2008 | Cieslik et al. | ................... | 62/515 |
| 2008/0283219 A1* | 11/2008 | Wyatt et al. | ................. | 165/80.4 |
| 2009/0142628 A1* | 6/2009 | Okada | ................ | H01M 2/0237 429/8 |
| 2009/0266513 A1* | 10/2009 | Xiong et al. | ................. | 165/80.3 |
| 2010/0038053 A1* | 2/2010 | Maxik et al. | ................ | 165/80.2 |
| 2010/0062321 A1* | 3/2010 | Nakamura | ............... | B60K 1/04 429/62 |
| 2010/0257883 A1* | 10/2010 | Damsohn et al. | ........... | 62/259.2 |
| 2011/0061834 A1* | 3/2011 | Vaatainen et al. | ........... | 165/80.2 |

FOREIGN PATENT DOCUMENTS

| | | | | |
|---|---|---|---|---|
| DE | 102007063176 | | 9/2008 | |
| DE | 102008016936 | | 10/2008 | |
| DE | 102007037416 | | 2/2009 | |
| DE | 102007050400 | | 4/2009 | |
| DE | 102008034869 | | 6/2009 | |
| DE | 102008034887 | | 6/2009 | |
| DE | WO 2009103464 | * | 8/2009 | ............ H01M 10/50 |
| WO | 2007118437 | | 10/2007 | |

* cited by examiner

DEVICE FOR COOLING BATTERIES

CROSS-REFERENCE TO RELATED APPLICATIONS

This application claims the benefit of German Provisional Patent Application Nos. DE 10 2011 002 064.0 filed Apr. 14, 2011 and DE 10 2011 002 133.7 filed Apr. 18, 2011; and German Utility Model Application No. DE 20 2012 101 076.3 filed Mar. 26, 2012, the entire disclosures of which are hereby incorporated herein by reference.

FIELD OF THE INVENTION

The invention relates to a device for cooling batteries, and more particularly to a device for cooling batteries of motor vehicles.

BACKGROUND OF THE INVENTION

In motor vehicles powered by electromotors, as well as in motor vehicles powered by a hybrid drive, the exact thermal conditioning of the vehicle battery is important to optimize the vehicle's range. Further, it is known that current electric energy storage devices are particularly sensitive to a varying temperature distribution so efforts are made to operate the batteries at an optimal temperature.

This requires a device to cool the batteries, also referred to as a heat dissipation device or a battery cooler. The cooling device ensures that waste heat, produced when the battery is operated, is removed from the battery and the battery is tempered to be at a homogeneous defined temperature level.

DE 10 2008 034 887 A1 discloses a cooling device for a battery with several cooling cells. The cooling device is provided with a cooling plate passable by a coolant. The battery cells are heat conductingly connected to the cooling plate.

Further, DE 10 2007 037 416 A1 discloses an electrochemical energy storage unit including a plurality of flat cells stapled above each other provided with an encasement over which the energy storage unit can be cooled.

From DE 10 2007 050 400 A1 a device to store electric energy is known, particularly for a motor vehicle, including a plurality of flat cells stapled above each other with their flat sides essentially arranged parallel to each other. The flat cells form a staple. A cooling element is located between neighboring flat cells of the staple. The cooling element is provided with an opening and a heat transfer element inserted into the opening.

Another approach to solve the problem of cooling the battery of motor vehicles is disclosed by DE 10 2007 063 176 A1. A heat conducting plate to temper the battery is proposed, with the battery provided with several individual cells switched parallel and/or in series to each other, that are heat conductingly connected to the heat conducting plate. For that a channel structure for a heat conducting medium is arranged in the heat conducting plate.

The above-described approaches to the problem of tempering motor vehicle batteries by cooling indicate that there is a wide variety of designs to perform battery cooling.

The objective of this invention is to establish a device for cooling batteries, particularly of motor vehicles, which provides a heat conducting connection of the battery cells to the cooling device and ensures an efficient production and assembly of the heat dissipation device.

The problem is solved by a device having the features of the invention described hereinafter.

SUMMARY OF THE INVENTION

In concordance and agreement with the present invention, a device for cooling batteries, has surprisingly been discovered.

In one embodiment, a device for cooling batteries comprises: a cooling plate for receiving at least one battery thereon; and at least one heat transfer element in heat transfer relationship with the cooling plate, wherein the at least one heat transfer element thermally abuts the cooling plate under mechanical stress.

In another embodiment, a device for cooling batteries comprises: a cooling plate for receiving at least one battery thereon; and at least one heat transfer element directly coupled to the cooling plate, the at least one heat transfer element in heat transfer relationship with the cooling plate, wherein the at least one heat transfer element thermally abuts the cooling plate under mechanical stress.

In yet another embodiment, a device for cooling batteries comprises: a cooling plate for receiving at least one battery thereon; and at least one heat transfer element disposed adjacent to the cooling plate, the at least one heat transfer element in heat transfer relationship with the cooling plate, wherein the at least one heat transfer element thermally abuts the cooling plate under mechanical stress produced by at least one leveling-out element.

Particularly, the problem of the invention is solved by a device for cooling batteries, particularly of motor vehicles, that is provided with a cooling plate to position and accept the battery, while heat is homogeneously absorbed and distributed over an entire surface of the cooling plate. Further, heat transfer elements of a cooling device are provided. The heat transfer elements are thermally contacted to the cooling plate under mechanical tension to optimize heat transfer between the heat transfer element and the cooling plate.

A device according to the invention for cooling batteries, apart from the actual cooler, includes other components that are essential to produce a thermal contact with the battery cells. This is based on a secure heat transfer independent of the ambient temperature, the temperature of the battery cells and many other parameters that has to be ensured over the life of the motor vehicle.

Prior art solves this problem by a plastic clamping frame, for example, through a force-closed connection.

According to the concept of the invention, one component realizes the heat transfer and contacting. The flexible cooling hose may be a coolant hose or a refrigerant hose depending upon the fluid contained therein. The heat carrier medium is guided in an inner side of the hose. Overpressure above the ambience governs in the cooling hose, deforming the cooling hose, pressing the cooling hose to the cooling plate, or heat carrier plate, respectively, or the battery cells.

The invention is advantageously established by heat transfer elements located between flexible, resilient elements to produce the contact force and the cooling plate, wherein contact of the heat transfer elements to the cooling plate in a thermally conducting manner is produced by mechanical stress.

In a preferred embodiment of the invention, the heat transfer elements are disposed between flexible, resilient elements and the cooling plate for producing the mechanical tension. The flexible, resilient elements are configured to apply the contact force. Preferably the flexible, resilient elements are established to be rubber-like or springy elements.

An especially advantageous embodiment of the concept according to the invention is to use flexible cooling hoses or flexible gel cooling cushions as the heat transfer elements. The flexible cooling hoses and the flexible gel cushions have the characteristic to level out surface irregularities, enabling a maximum area contact and, as a result, a thermally conducting connection. It is particularly advantageous that the cooling hoses perform a dual function. First, the function of the heat transfer elements and, second, the function of the contact pressure member.

Fiber-reinforced, multi-ply hose materials, for example, or cooling water hose or refrigerant hose materials are used as hose materials.

In a particularly preferred embodiment, the cooling hose is established as hybrid hose with a cooling plate vulcanized-in.

An advantageous design embodiment of the contact of the heat transfer elements to the cooling plate is through mechanical fastening means in that the cooling pipes or the flat pipes are bolted to the cooling plate.

Alternatively to the force-closed connection through bolting of the heat transfer elements to the cooling plate, the heat transfer elements can also be adhesively bonded to the cooling plate with a suitable adhesive chosen ensuring sufficient heat transfer.

In a further embodiment, the cooling hoses and flexible gel cushions are disposed between a battery casing bottom or a supporting plate and the cooling plate under mechanical stress so that a contact of the heat transfer elements to the cooling plate can be maximized.

The cooling hose is, to another embodiment of the invention, deformed in such a way that a cooling plate, cooling pipes or flat pipes were pressed to the battery cells through the pressure in the hose.

Further, it is especially advantageous to place the heat transfer elements between resilient leveling-out elements to generate the contact force and the cooling plate, wherein a frame with a clip element is provided to hold the cooling plate. The cooling plate is clippable into the clip element when assembling the heat dissipation device.

Thus, the concept of the invention is that a battery is coupled to a heat transfer element over a cooling plate. The cooling plate also acts as leveling-out plate regarding the temperature distribution. Another function of the cooling plate is to accept and hold the battery, which is enabled by an appropriate static dimensioning of the cooling plate such that the relatively heavy battery is properly held and secured.

According to the concept the connection of the heat transfer element to the cooling plate is produced under mechanical stress by a contact force to maximize the heat transfer.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
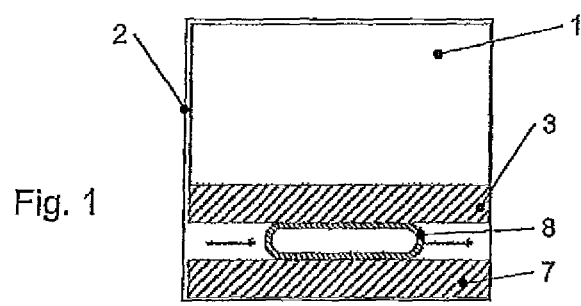
FIG. 1 is a schematic cross-sectional view of a heat dissipation device for cooling at least one battery including a flexible cooling hose according to one embodiment of the invention.

FIG. 1 shows a heat dissipation device for cooling at least one battery 1. The device includes flexible cooling hose 8. The cooling hose 8 is meant to be a flexible coolant hose or a refrigerant hose. Walls of the cooling hose 8 are flexibly put against adjacent solid surfaces to make an area contact over regions of the surfaces. The battery 1 disposed within a battery casing 2 bears against a cooling plate 3. The cooling plate 3 rests on the cooling hose 8. The cooling hose 8 is carried by a battery casing bottom 7. Schematically indicated by arrows in FIG. 1, the cooling hose 8 is not guided regarding its position relative to the cooling plate 3 so that the cooling hose 8 can be flexibly laid, such as meander shaped, between the battery casing bottom 7 and the cooling plate 3. Contact pressure of the cooling hose 8 is realized by an overpressure in the cooling hose 8 above the ambience.

Figure 2:
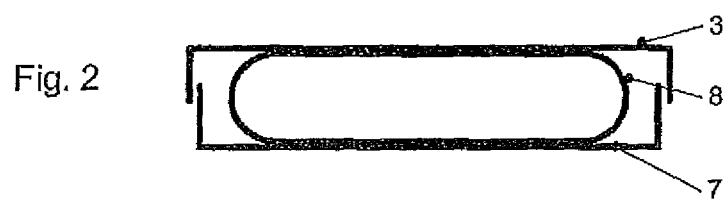
FIG. 2 is a schematic cross-sectional view of a heat dissipation device for cooling at least one battery including a cooling hose guided between a cooling plate and a battery casing bottom according to another embodiment of the invention.

In comparison, in FIG. 2 the cooling hose 8 is positioned in a guided manner in the battery casing bottom 7. The battery casing bottom 7 includes a raised border to guide the cooling hose 8. The cooling plate 3 resting on the cooling hose 8 is provided with an edge corresponding to the border of the battery casing bottom 7 so that the cooling plate 3 and the battery casing bottom 7 telescope-like engage each other. According to the heat transfer tasks, the cooling hose 8 is passed by a coolant in form of a cold carrier, or by a refrigerant. The battery casing bottom 7 is made of a plastic material for insulation, manufacture and cost reasons, whereas the cooling plate 3 is made of aluminum. Thus, the cooling plate 3 maximizes heat conduction within the surface and levels out possible punctual thermal peak loads caused by individual battery cells. In addition, the cooling hose 8 disposed against the cooling plate 3 maximizes heat transmission from the cooling plate 3 to the cooling hose 8.

Figure 3:
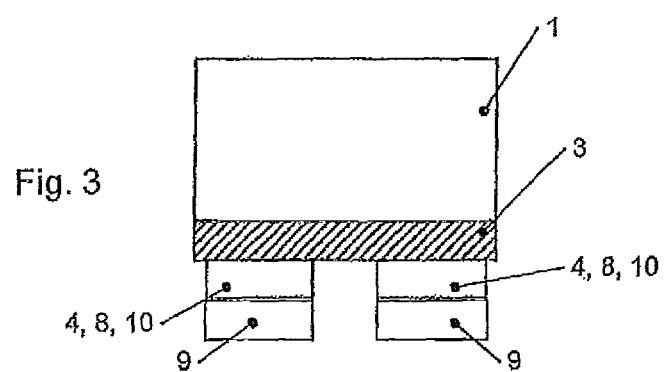
FIG. 3 is a schematic cross-sectional view of a heat dissipation device for cooling at least one battery including a leveling-out element according to another embodiment of the invention.

FIG. 3 shows a heat dissipation device including the cooling plate 3. Heat transfer elements are shown as cooling pipes 4, the cooling hoses 8 and/or flat pipes 10 pressed against the cooling plate 3 over resilient leveling-out elements 9. Thermal conducting foil or thermal conducting paste provided between connected surfaces maximizes the heat conducting connection between the heat transfer elements (i.e. the cooling pipes 4, the cooling hoses 8 and the flat pipes 10) and the cooling plate 3, as well as a connection between the cooling plate 3 and the battery 1.

Figure 4:
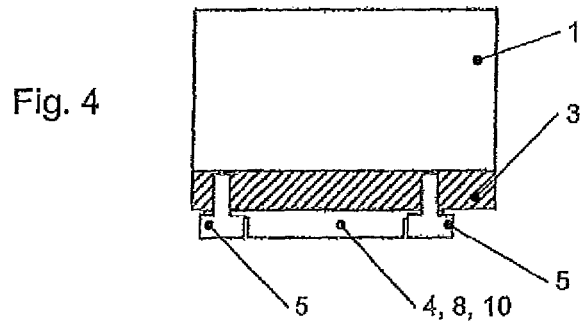
FIG. 4 is a schematic cross-sectional view of a heat dissipation device for cooling at least one battery including a heat transfer element bolted to a cooling plate.

In a further embodiment to FIG. 3, FIG. 4 shows the cooling plate 3 connected to the heat transfer elements (i.e. the cooling pipes 4, the cooling hoses 8 and the flat pipes 10) by fastening means 5 such as bolts, for example. The heat transfer elements are preferably established as the flat pipes 10, thus advantageously contactable to the cooling plate 3 using a bolt connection. The battery 1, in each case, is not firmly connected to the leveling-out plate as the battery 1 is exchangeable and easily removable.

The heat transfer from the cooling plate 3 to the cooling pipes 4 or the fastening means 5 is enhanced by means of thermal conducting foil or thermal conducting paste.

Figure 5:
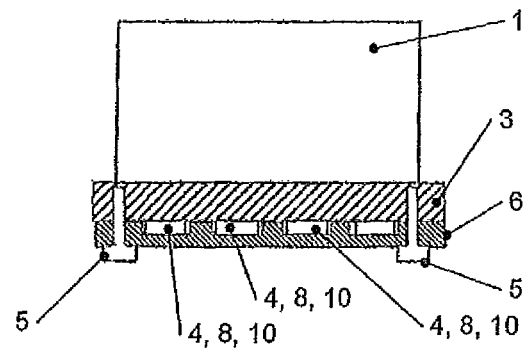
FIG. 5 is a schematic cross-sectional view of a heat dissipation device for cooling at least one battery including a plurality of heat transfer elements according to another embodiment of the invention.

FIG. 5 shows a heat dissipation device including a plurality of the heat transfer elements such as the cooling pipes 4, the cooling hoses 8, and/or the flat pipes 10. The heat transfer elements are disposed in a supporting plate 6 provided with groove-like recesses to guide the heat transfer elements. The supporting plate 6 is bolted to the cooling plate 3 through the fastening means 5. Dimensions of the guide for the heat transfer elements in the supporting plate 6 are such that the heat transfer elements is disposed under stress between the supporting plate 6 and the cooling plate 3 and pressed to the cooling plate 3 to maximize the heat transfer therebetween. The battery 1 is directly disposed on the cooling plate 3. Thus, the supporting plate 6 presses the heat transfer elements to the cooling plate 3.

Figure 6:
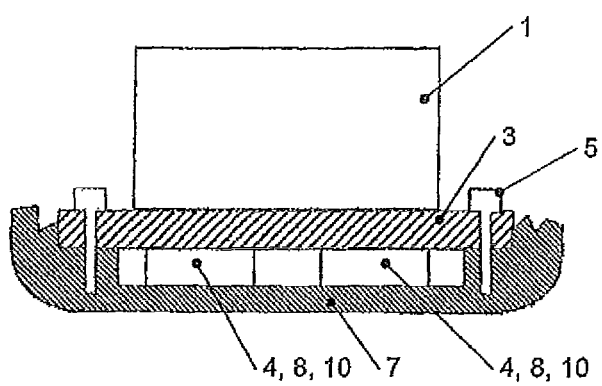
FIG. 6 is a schematic cross-sectional view of a heat dissipation device for cooling at least one battery including a bolted cooling plate and a casing bottom according to another embodiment of the invention.

In FIG. 6 a heat dissipation device including a bolted cooling plate 3 and battery casing bottom 7 is shown. In the embodiment shown, the cooling plate 3 is bolted from the top to the battery casing bottom 7. Similar to the embodiment of FIG. 5, the heat transfer elements (i.e. the cooling pipes 4, the cooling hoses 8, and/or the flat pipes 10) are constrained between the cooling plate 3 and the battery casing bottom 7.

Figure 7:
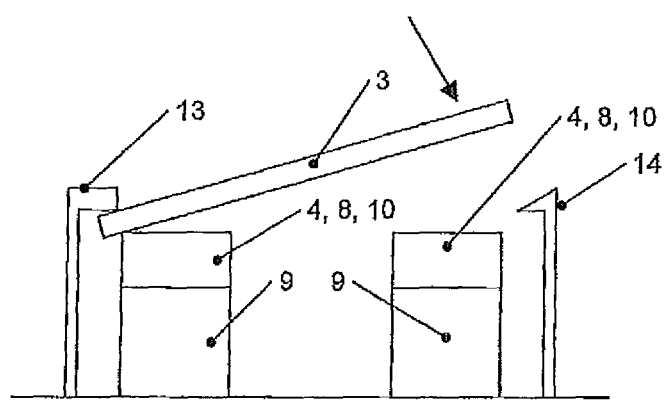
FIG. 7 is a schematic cross-sectional view of a heat dissipation device for cooling at least one battery including a clippable cooling plate according to another embodiment of the invention.

In FIG. 7 an easily mountable embodiment of the connection between cooling plate 3 and the heat transfer elements (i.e. the cooling pipes 4, the cooling hoses 8, and/or the flat pipes 10) is shown. In the embodiment shown, a frame 13 to receive the cooling plate 3 is supplemented with a clip element 14. The cooling plate 3, as shown in FIG. 7, is inserted into the frame 13 on a side and fixed. Another side of the cooling plate 3 is moved in direction of the arrow until the cooling plate 3 snaps into place in the clip element 14 under stress. The heat transfer elements (i.e. the cooling pipes 4, the cooling hoses 8, and/or the flat pipes 10) are supported by leveling-out elements 9. The leveling-out elements 9 are configured as elastically reversible elements that in a mounted position apply an upward contact force to the heat transfer elements (i.e. the cooling pipes 4, the cooling hoses 8, and/or the flat pipes 10) and the clipped-in cooling plate 3 to maximize the heat transfer.

The leveling-out elements 9 can also be configured as hydraulically acting leveling-out elements such as gel cushions, a water bed, or polymer materials with resilient properties, for example.

From the foregoing description, one ordinarily skilled in the art can easily ascertain the essential characteristics of this invention and, without departing from the spirit and scope thereof, make various changes and modifications to the invention to adapt it to various usages and conditions.

NOMENCLATURE 1 battery
2 battery casing
3 cooling plate
4 cooling pipe, heat transfer element
5 fastening means, bolts
6 supporting plate
7 battery casing bottom
8 cooling hose, heat transfer element
9 leveling out element
10 flat pipes, heat transfer element
11 pipe connection
12 tank with end caps
13 frame
14 clip element

What is claimed is:

1. A device for cooling a battery of a motor vehicle, comprising:
 a cooling plate having a top surface contacting an entire bottom surface of the battery;
 a plurality of flexible cooling hoses contacting a bottom surface of the cooling plate; and
 a plurality of leveling-out elements supporting the flexible cooling hoses, wherein each of the flexible cooling hoses is provided between the cooling plate and a respective one of the leveling-out elements wherein the flexible cooling hoses thermally abut the cooling plate under mechanical stress produced by the leveling-out elements,
 wherein the leveling-out elements are at least one of a hydraulically acting element, a gel cushion, a water bed, and a polymer material with resilient properties.

2. The device according to claim 1, wherein the flexible cooling hoses are disposed between the cooling plate and the leveling-out elements to apply a contact force to the cooling plate.

3. The device according to claim 1, wherein the flexible cooling hoses are configured as a hybrid hose with a vulcanized-in cooling plate.

4. The device according to claim 1, wherein the flexible cooling hoses are affixed to the cooling plate by a fastening means.

5. The device according to claim 4, wherein the fastening mean is a bolt.

6. The device according to claim 1, wherein the flexible cooling hoses are adhesively bonded to the cooling plate.

7. The device according to claim 1, wherein the flexible cooling hoses are disposed between the cooling plate and at least one of a battery casing bottom and a supporting plate.

8. The device according to claim 7, wherein the battery casing bottom includes a raised border to guide the flexible cooling hoses.

9. The device according to claim 7, wherein the supporting plate includes at least one groove-like recess to guide the flexible cooling hoses.

10. The device according to claim 1, wherein the cooling plate is received in a frame provided with a clip element.

* * * * *